US006472614B1

United States Patent
Dupont et al.

(10) Patent No.: US 6,472,614 B1
(45) Date of Patent: Oct. 29, 2002

(54) DYNAMIC UMBILICALS WITH INTERNAL STEEL RODS

(75) Inventors: Wayne Dupont, Houston, TX (US); Richard Rinehart, Webster, TX (US); John McManus, Houston, TX (US)

(73) Assignee: Coflexip (FR)

( * ) Notice: Subject to any disclaimer, the term of this patent is extended or adjusted under 35 U.S.C. 154(b) by 0 days.

(21) Appl. No.: 09/479,186

(22) Filed: Jan. 7, 2000

(51) Int. Cl.[7] ................................................. H01B 7/14
(52) U.S. Cl. .................... 174/705; 174/47; 138/110; 138/111
(58) Field of Search ................ 174/47, 68.1, 102 R, 174/106 R, 705; 405/158; 138/103, 108, 110, 111; 204/190

(56) References Cited

U.S. PATENT DOCUMENTS

| | | | | |
|---|---|---|---|---|
| 4,077,022 A | * | 2/1978 | Pitts, Jr. ........................ 333/1 |
| 4,250,351 A | * | 2/1981 | Bridges .................. 174/106 R |
| 4,378,464 A | * | 3/1983 | Marmignon et al. .... 174/105 R |
| 4,427,033 A | * | 1/1984 | Ege ............................. 138/103 |
| 4,440,974 A | * | 4/1984 | Naudet ....................... 174/108 |
| 5,061,823 A | * | 10/1991 | Carroll .................. 174/105 R |
| 5,329,605 A | * | 7/1994 | Wargotz ..................... 385/107 |
| 5,362,921 A | | 11/1994 | Birkelund et al. ............ 174/47 |
| 6,012,495 A | * | 1/2000 | Antonsen ..................... 138/131 |
| 6,323,420 B1 | * | 11/2001 | Head ............................. 174/47 |

OTHER PUBLICATIONS

*Specification for Subsea Production Control Umbilicals*, API Specification 17E, Second Edition Sep. 1, 1998, American Petroleum Institute.
Duco Inc., *Umbilical Manufacturing Plant Current & Future Capabilities*, Michael Bryant & Joe Hoffman, Houston, Engergy Week Conference, 1997.

* cited by examiner

Primary Examiner—Dean A. Reichard
Assistant Examiner—W. David Walkenhorst
(74) Attorney, Agent, or Firm—Ostrolenk, Faber, Gerb & Soffen, LLP

(57) ABSTRACT

In an umbilical, one or more steel rods, which provide strength and ballast, are wound helically within the umbilical along with the steel tubes and/or elongated active umbilical elements. These steel rods replace some or all of the thermoplastic filler elements that would otherwise be included within the umbilical. An umbilical according to an embodiment of the invention may include a plurality of steel tubes helically wound around a core, and at least one substantially solid steel rod helically wound around the core, the steel rod being arranged in a void between the steel tubes. Thus, the invention avoids the need to apply additional armoring layers to the outside of the umbilical for strength and ballast.

13 Claims, 1 Drawing Sheet

US 6,472,614 B1

DYNAMIC UMBILICALS WITH INTERNAL STEEL RODS

BACKGROUND OF THE INVENTION

1. Field of the Invention

The present invention relates to improvements in umbilicals, particularly steel umbilicals for use in dynamic applications such as in risers.

2. Background Art

An umbilical consists of a group of one or more types of elongated active umbilical elements, such as electrical cables, optical fiber cables, or hoses, cabled together for flexibility and over-sheathed and/or armored for mechanical strength and ballast.

Umbilicals are used for transmitting power, signals and fluids (fluid injection, hydraulic power, gas release, etc.) to and from a subsea installation via the various elongated umbilical elements. An increasingly important use of umbilicals is the transmission of electrical power to electrical devices on the seabed, and depths of up to 6000 feet (2000 meters) are becoming common.

Generally, the elements are arranged within the umbilical as symmetrically as possible. The cross-section is preferably circular. In order to fill the interstitial voids between the various umbilical elements and obtain the desired circular configuration, filler components may be included within the voids (see the API specification, cited below, at pages 12–14).

Umbilicals have to be able to withstand substantial laying and service loads and load combinations, and perform their functions for an extended design life, typically 25 years.

Electrical and/or optical fiber cables are not designed to resist the loads applied to the umbilical. These hoses and tubes, generally made of thermoplastic material or steel, are designed merely to resist collapse.

The umbilical elements are generally wound together in the well-known S-Z configuration (API, page 42). Then this bundle is over-sheathed. Since the S-Z configuration cannot withstand substantial tensile stress without unwinding, additional layers of armoring (steel or Kevlar, for example) must be wound counterhelically around this bundle. Then an external thermoplastic sheath is applied (API, pages 43–44).

A steel tube umbilical is defined as an umbilical wherein all or most of the elongated umbilical elements which compose the umbilical are made of steel tubes. The steel tubes and the other elongated umbilical elements that make up the umbilical are wound in a helical pattern around a central core. The core may be a flexible plastic tube, a larger steel tube, or one of the elongated umbilical elements. The steel tubes are plastically deformed by the winding and do not unwind. With the helically wound steel tubes, such an umbilical under normal conditions (such as static applications and/or use at moderate water depth) will be able to withstand the moderate loads to be applied to it without the addition of substantial armoring layers.

However, under severe conditions (such as use in deep water and/or in dynamic applications), increased loads will be applied to the umbilical, due to the weight of the umbilical and to the dynamic movement of water. Strengthening elements and ballast elements have to be added to the umbilical to withstand these loads. The API specification suggests adding several external layers of armoring wires wound helically around the umbilical. This measure, however, leads to an increase in the external diameter of the umbilical and a corresponding increase in the hydrodynamic load (see for example cross-section E-3.7 in the API Specification).

FIG. 1 is a cross-section of a conventional steel tube dynamic umbilical. This umbilical comprises a central core 1. The central core 1 may be made of steel for transporting fluid. Or, for transporting electrical power, for example, the core may be made of metallic strand over-sheathed with a thermoplastic material. Disposed around the core are three steel tubes 2 for transporting fluid; two optical fiber cables 4; two armored electric power and/or signaling bundles 5; two thermoplastic fillers 6; and a sheath 8. Surrounding the sheath 8 is at least a pair of counter-helically wound armoring wires 12 and an outer sheath 14 of the type described in the API and in the '921 patent (discussed below).

The steel tubes, optical fiber cables, bundles and fillers are stranded together around the central core by means of a vertical helix machine. A suitable vertical helix machine is described in Bryant et al., "Duco, Inc., Umbilical Manufacturing Plant, Current & Future Capabilities," published in Houston at the Energy Week Conference, 1997 incorporated by reference. The resulting bundle is then coated.

The thermoplastic fillers fill the interstices between the several components of the umbilical in order to provide a circularly symmetrical arrangement.

The steel tubes are designed to resist collapse pressure and also to resist moderate tensile loading. The outside armor layers 12 provide additional strength and ballast.

The steel tubes may be made of carbon steel or stainless steel, for example. If they are made of carbon steel, they should be thermoplastic coated or zinc coated in order to provide acceptable corrosion resistance.

The outer sheath can be made by extrusion of thermoplastic (such as polyethylene) or may be woven (e.g., polypropylene yarn). It is also known to include sacrificial anodes within an umbilical, as shown for example in U.S. Pat. No. 5,362,921 owned by Alcatel STK), incorporated by reference. Sacrificial anodes 4 and 5, made of zinc, are arranged in between the steel tubes 3. Substantially the only function of these sacrificial anodes is to act in combination with the galvanized steel core member (1, 2) to protect the umbilical from corrosion. They do not absorb any substantial tensile loading or increase the weight of the umbilical. On the contrary, the '921 patent teaches that the way to strengthen the umbilical is to add two layers of armor wires (7, 8) in the outer part of the umbilical.

API (American Petroleum Institute) Specification 17E, "Specification for Subsea Production Control Umbilicals" (September 1998), incorporated by reference, provides standards for the design and manufacture of umbilicals. There is no standard for steel tube umbilicals at this moment but a standard ISO CD 13628-5 (current version incorporated by reference) concerning both conventional API 17E and steel tube umbilicals is in progress and will be issued in mid-2000.

In order to achieve the requirements for use under severe conditions, it would be conceivable to increase the wall thickness of the tubes. However, increasing the wall thickness of the steel tubes entails the following drawbacks:

the flexibility of the umbilical is reduced.

the manufacture of the umbilical becomes more difficult or even impossible.

In order to avoid the above drawbacks the conventional measure as discussed above is to add additional layers of armoring for ballast. But adding armoring layers to the umbilical brings with it the following additional drawbacks:

the outer diameter of the umbilical increases, which leads to an increase in the hydrodynamic drag area.

the manufacturing cost increases, since an armoring machine is needed for the armor layers and the number of manufacturing passes is increased as well.

SUMMARY OF THE INVENTION

The present invention is adapted to address the foregoing drawbacks, specifically in dynamic or deep-water applications where additional armoring layers are conventionally added to the umbilical (deepwater, high tensile load, ballast). In an umbilical according to an important feature of the invention, one or more steel rods, which provide strength and ballast, are wound helically within the umbilical along with the steel tubes and/or elongated active umbilical elements. Advantageously these steel rods replace some or all of the thermoplastic filler elements that would otherwise be included within the umbilical. Thus, the invention avoids the need to apply additional armoring layers to the outside of the umbilical for strength and ballast.

Other features and advantages of the present invention will become apparent from the following description of embodiments of the invention, with reference to the accompanying drawings.

DETAILED DESCRIPTION OF AN EMBODIMENT OF THE INVENTION

Figure 1:
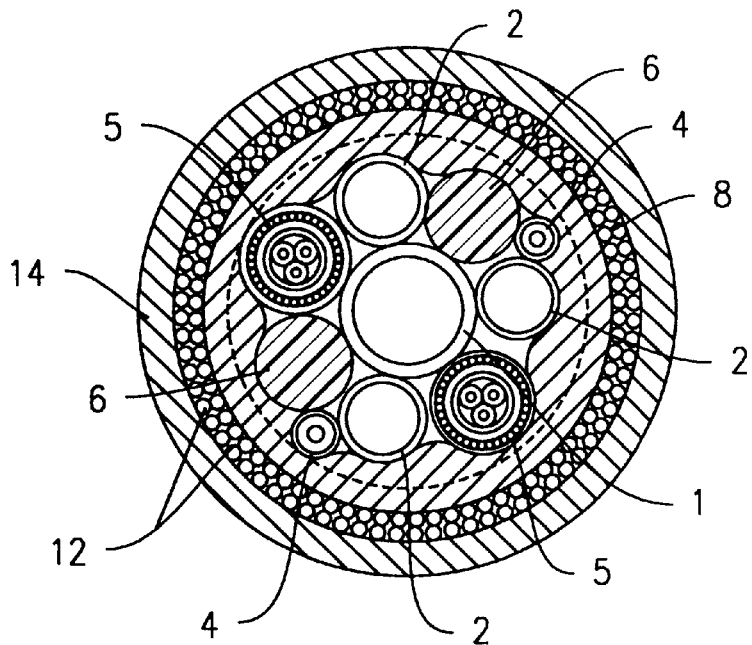
FIG. 1 is a cross-sectional view of a conventional umbilical.
Figure 2:
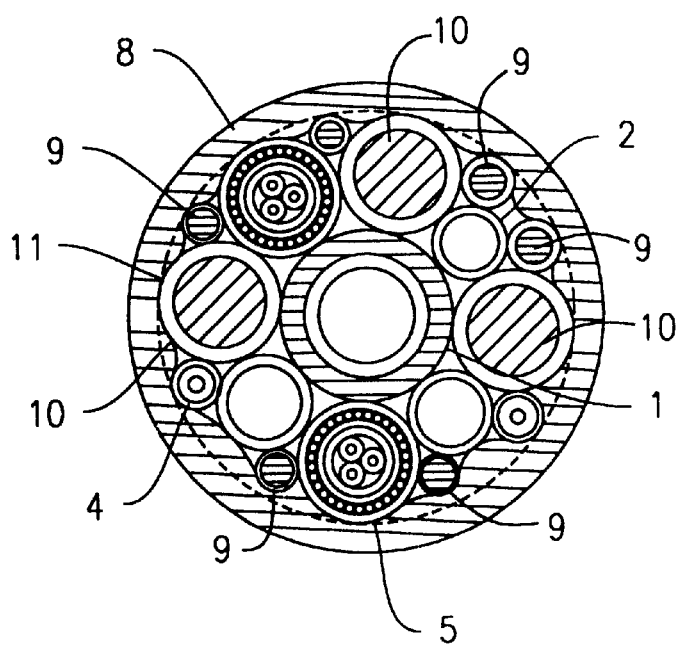
FIG. 2 is a cross-sectional view of an umbilical according to an embodiment of the invention.

FIG. 2 is a cross-sectional view of a dynamic umbilical, for example for use as a riser, according to an embodiment of the invention. The respective fluid-carrying and other conduits in the umbilical of FIG. 2 correspond to those in FIG. 1. Unnecessary redundant description of those elements will be omitted.

In order to provide an improved, smaller umbilical for dynamic application, with excellent stability, high tensile resistance and fatigue resistance, the thermoplastic fillers in the umbilical of FIG. 1 have been replaced with three solid steel rods 10 which in this embodiment have a diameter of 20 mm. These steel rods are designed to absorb the tensile loading and to ballast the umbilical. In order further to increase the weight, small solid steel rods 9, which may be about 8 mm in diameter, are also added, in the periphery of the bundle. With this arrangement, the steel rods act as both tension and ballast elements and the need of an outer layer of armoring is avoided.

The steel rods 9, 10 may be made of carbon steel or stainless steel, for example. A coating 11 is provided on the rods when needed for corrosion resistance.

The steel rods are substantially solid. In this context, "substantially solid" means that the steel rods may be completely solid, or may be dense enough to provide enough weight to obtain the advantages of the invention.

In prior art dynamic umbilicals, it was conventional to add two layers of armoring wires, for example, and additional thermoplastic sheathing, in order to increase the strength and weight of the umbilical when necessary. These additional layers could increase the outside diameter of the umbilical by 20% for example. As an example, the umbilical of FIG. 1 will have an external diameter of about 100 mm. By comparison, the embodiment of the invention shown in FIG. 2 will have an external diameter of only about 80 mm.

The hydrodynamic drag of an umbilical in moving water is determined by the following formula:

$$D = \rho \cdot C_d \cdot D \cdot U^2(t)/2$$

wherein:

$\rho$ is the density of water;

$C_d$ is the drag coefficient;

$U(t)$ is the velocity of the water (current, wave, etc.); and $D$ is the diameter of the umbilical.

Consequently, the umbilical diameter is increased by 20%, the hydrodynamic drag is also increased by 20%. Thus, when the hydrodynamic drag area is substantial, it is necessary either to increase the tension in the dynamic umbilical or to add yet another layer of armoring to further increase the weight in order to stabilize the umbilical. These disadvantages are avoided by the present invention, in which internal steel rods can be used, to provide additional weight and stability without increasing the diameter of the umbilical.

The main advantages of this design are the following:

The use of steel rods in combination with metal tubes increases the tensile capacity of an umbilical, allowing installation and continuous dynamic use in deeper water.

The steel rods reduce the stress in the steel tubes which results in increased service life of the umbilical.

The steel rods also increase the mass of the umbilical without increasing the external diameter and consequently the hydrodynamic drag area of the umbilical, which results in reduced dynamic riser excursions, and in turn prevents interference with other objects.

Since the steel rods are sufficient for absorbing the tensile loading, the conventional steel tubes in the umbilical can be designed merely to resist collapsing pressure only, resulting in a decrease in the wall thickness of the tube and consequently a decrease in manufacturing cost.

The steel rods are assembled in the same manufacturing pass as the conventional steel tubes, which avoids the need of an additional manufacturing process for armoring, and consequently the need for an armoring machine.

The invention can be used both in static, deepwater applications when substantial loading is to be applied to the umbilical, and in dynamic applications when the umbilical is too light and ballast is needed.

Any number of steel rods can be provided in order to obtain the benefits of the invention, the only limitation being the amount of empty space available given the conduits, steel tubes and other elements needed in the umbilical.

Although the present invention has been described in relation to particular embodiments thereof, many other variations and modifications and other uses will become apparent to those skilled in the art. Therefore, the present invention is not limited by the specific disclosure herein.

What is claimed is:

1. An umbilical comprising:

a plurality of steel tubes helically wound around a core; and at least one substantially solid steel rod helically wound around said core, said substantially solid steel rod being shaped and sized for absorbing tensile loading on said umbilical, said at least one steel rod being arranged in a void between said steel tubes;

said umbilical is without an outside armor layer outward of said steel tubes and said at least one steel rod.

2. The umbilical of claim 1, further comprising at least one elongated umbilical element selected from the group consisting of thermoplastic tubes, optical fiber cables, and electrical power and communications cables.

3. The umbilical of claim 2, further comprising a non-metallic outer sheath surrounding and in direct contact with at least some of said plurality of steel tubes and said elongated umbilical elements.

4. The umbilical of claim 1, wherein said at least one steel rod is made of solid steel.

5. An umbilical comprising:

a plurality of steel tubes helically wound around a core; and at least one substantially solid steel rod helically wound around said core, said steel rod being arranged in a void between said steel tubes;

at least one elongated umbilical element selected from the group consisting of thermoplastic tubes, optical fiber cables, and electrical power and communications cables; and a non-metallic outer sheath surrounding and in direct contact with at least some of said plurality of steel tubes and said elongated umbilical elements;

wherein said at least one steel rod is in direct contact with said non-metallic outer sheath and wherein said umbilical is without an outside armor layer outward of said steel tubes and said at least one steel rod.

6. The umbilical of claim 5, wherein said substantially solid steel rod is shaped and sized for absorbing tensile loading on said umbilical.

7. A method of increasing the tensile load capacity of an umbilical comprising a plurality of steel tubes helically wound around a core so as to increase the hydrodynamic stability of said umbilical, said method comprising the step of helically winding at least one substantially solid steel rod in a void between said steel tubes and around said core, said substantially solid steel rod being shaped and sized for absorbing tensile loading on said umbilical; and not applying an outside armor layer outward of said steel tubes and said at least one steel rod.

8. The method of claim 7, further comprising the step of helically winding around said core at least one elongated umbilical element selected from the group consisting of thermoplastic tubes, optical fiber cables, and electrical power and communications cables.

9. The method of claim 8, further comprising the step of placing a non-metallic outer sheath surrounding and in direct contact with at least some of said plurality of steel tubes and said elongated umbilical elements.

10. The method of claim 7, comprising the step of making said at least one steel rod of solid steel.

11. The method of claim 7, wherein said umbilical further comprises at least one plastic filler helically wound around said core with said steel tubes, said method comprising the step of replacing said at least one plastic filler with said at least one steel rod.

12. A method of increasing the hydrodynamic stability of an umbilical comprising a plurality of steel tubes helically wound around a core, said method comprising the steps of:

arranging at least one substantially solid steel rod in a void between said steel tubes and helically winding said at least one steel tube around said core;

helically winding around said core at least one elongated umbilical element selected from the group consisting of thermoplastic tubes, optical fiber cables, and electrical power and communications cables;

placing a non-metallic outer sheath surrounding and in direct contact with at least some of said plurality of steel tubes and said elongated umbilical elements;

placing said at least one steel rod in direct contact with said non-metallic outer sheath; and not applying an outside armor layer outward of said steel tubes and said at least one steel rod.

13. The method of claim 12, wherein said substantially solid steel rod is shaped and sized for absorbing tensile loading on said umbilical.

* * * * *